US012671899B2

(12) United States Patent
Watanabe

(10) Patent No.: US 12,671,899 B2
(45) Date of Patent: Jun. 30, 2026

(54) CONTROL APPARATUS, IMAGE PICKUP APPARATUS, CONTROL METHOD, AND STORAGE MEDIUM SETTING A FIRST OR A SECOND DEPTH OF FIELD IN A CASE WHERE OBJECTS ARE SUPERIMPOSED AND IN A CASE WHERE A MAIN OBJECT IS SWITCHED

(71) Applicant: CANON KABUSHIKI KAISHA, Tokyo (JP)

(72) Inventor: Kentaro Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 44 days.

(21) Appl. No.: 18/951,853

(22) Filed: Nov. 19, 2024

(65) Prior Publication Data

US 2025/0203204 A1     Jun. 19, 2025

(30) Foreign Application Priority Data

Dec. 13, 2023     (JP) ................................. 2023-209762

(51) Int. Cl.
  *H04N 5/335*       (2011.01)
  *H04N 23/67*       (2023.01)
  *H04N 23/69*       (2023.01)
(52) U.S. Cl.
  CPC ........... *H04N 23/675* (2023.01); *H04N 23/69* (2023.01)

(58) Field of Classification Search
  CPC .................................................... H04N 23/959
  See application file for complete search history.

(56) References Cited

U.S. PATENT DOCUMENTS

| | | | | |
|---|---|---|---|---|
| 9,270,902 | B2 * | 2/2016 | Watanabe | H04N 23/62 |
| 9,948,848 | B2 * | 4/2018 | Tokui | G03B 13/36 |
| 11,196,914 | B2 * | 12/2021 | Takahashi | H04N 5/2226 |
| 11,669,975 | B2 * | 6/2023 | Aoyama | G06T 7/20 |
| | | | | 348/169 |

FOREIGN PATENT DOCUMENTS

JP        2022-022767 A        2/2022

* cited by examiner

*Primary Examiner* — Gary C Vieaux
(74) *Attorney, Agent, or Firm* — Venable LLP

(57)        ABSTRACT

A control apparatus includes a memory storing instructions, and a processor configured to execute the instructions to select a main object as a target to be focused on from among objects included in an image, perform a first setting that sets a first depth of field to a second depth of field deeper than the first depth of field in a case where the objects are superimposed in a depth direction, and perform a second setting that sets the second depth of field to the first depth of field in a case where the main object is switched after the first setting is performed.

14 Claims, 5 Drawing Sheets

CONTROL APPARATUS, IMAGE PICKUP APPARATUS, CONTROL METHOD, AND STORAGE MEDIUM SETTING A FIRST OR A SECOND DEPTH OF FIELD IN A CASE WHERE OBJECTS ARE SUPERIMPOSED AND IN A CASE WHERE A MAIN OBJECT IS SWITCHED

BACKGROUND

Technical Field

The present disclosure relates to a control apparatus, an image pickup apparatus, a control method, and a storage medium.

Description of Related Art

Technologies for setting an object suitable for a photographer's intention as an autofocus (AF) target in a case where a plurality of objects are detected, and for capturing the AF target in an in-focus state have conventionally been proposed. Japanese Patent Laid-Open No. 2022-022767 discloses a configuration that determines, as a main object, in a case where a plurality of moving objects are detected, an object (foremost object) positioned at the front of the moving direction.

The configuration of Japanese Patent Laid-Open No. 2022-022767 presumes main use of imaging of sports scenes such as races, but in such a scene, even if the foremost object is set as the main object, imaging with the foremost object in focus is not always possible. For example, in a case where a first object in an in-focus state is overtaken by a second object, which then becomes a new foremost object, the second object is potentially out of focus right after the overtaking. Furthermore, after the second object as the main object is set as the AF target, the second object cannot be in an in-focus state until a camera performs calculations and moves lenses. Particularly in sports scenes such as races, suitable imaging opportunities (photo opportunities) are limited, and if the foremost object remains out of focus, the imaging opportunities are further limited.

SUMMARY

A control apparatus according to one aspect of the disclosure includes a memory storing instructions, and a processor configured to execute the instructions to select a main object as a target to be focused on from among objects included in an image, perform a first setting that sets a first depth of field to a second depth of field deeper than the first depth of field in a case where the objects are superimposed in a depth direction, and perform a second setting that sets the second depth of field to the first depth of field in a case where the main object is switched after the first setting is performed. An image pickup apparatus having the above control apparatus also constitutes another aspect of the disclosure. A control method corresponding to the above control apparatus also constitutes another aspect of the disclosure. A storage medium storing a program that causes a computer to executes the above control method also constitutes another aspect of the disclosure.

Further features of various embodiments of the disclosure will become apparent from the following description of exemplary embodiments with reference to the attached drawings.

DETAILED DESCRIPTION

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Figure 1:
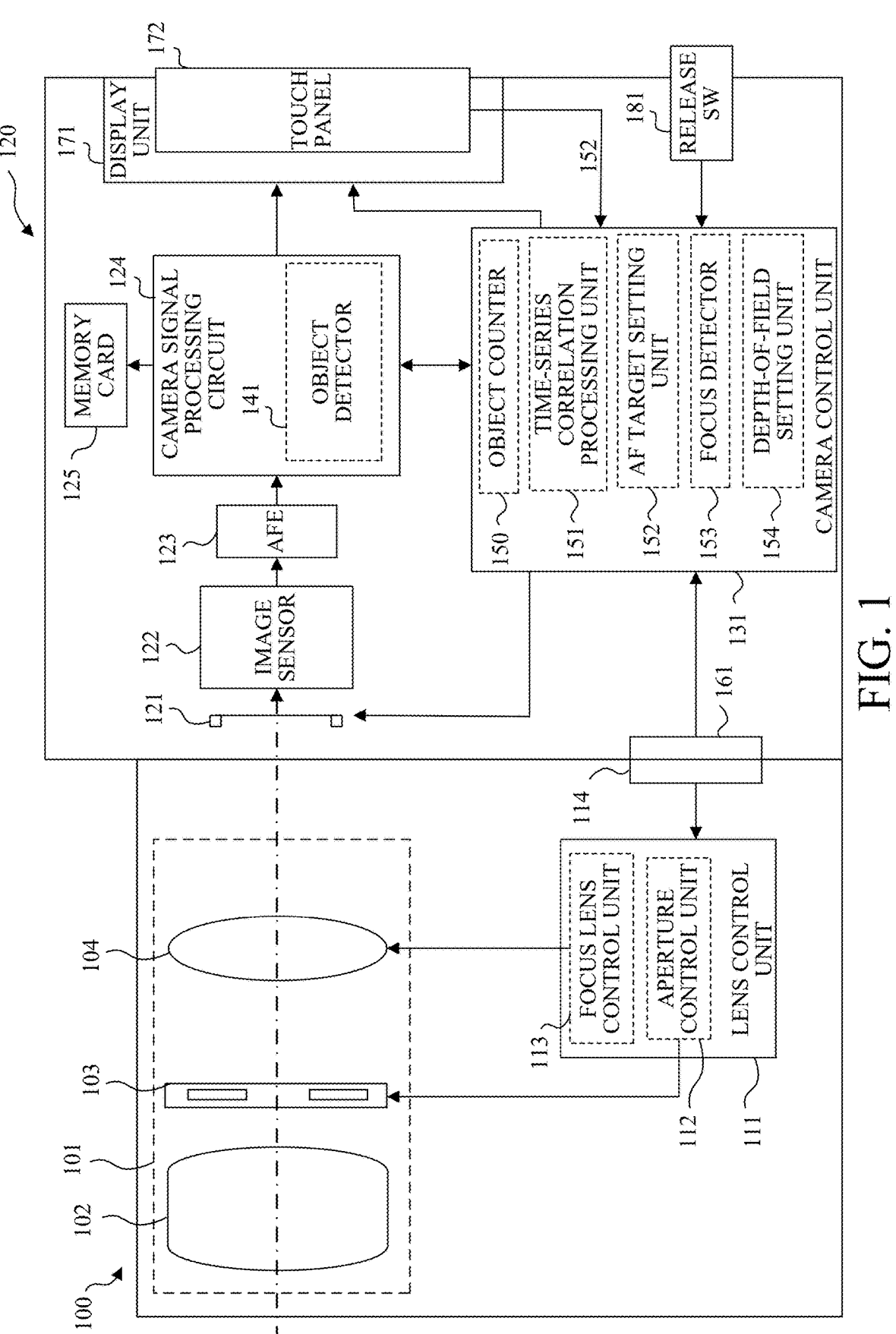
FIG. 1 is a configuration diagram of an image pickup apparatus according to this embodiment.

FIG. 1 is a configuration diagram of a camera system (referred to as a camera hereinafter) according to this embodiment. The camera includes an interchangeable lens 100 and a camera body (image pickup apparatus) 120. In this embodiment, the camera body 120 is a mirrorless camera as an example of an image pickup apparatus. The interchangeable lens 100 is attached to and detachable from the camera body 120.

The interchangeable lens 100 includes an imaging lens unit 101 and a lens system control microcomputer (hereinafter referred to as lens control unit) 111. The imaging lens unit 101 includes a main imaging optical system 102, an aperture stop (diaphragm) 103 configured to adjust a light amount, and a focus lens unit 104 configured to perform focusing. The lens control unit 111 includes an aperture control unit 112 configured to control the aperture stop 103, and a focus lens control unit 113 configured to control the focus lens unit 104. The focus lens control unit 113 drives the focus lens unit 104 in an optical axis direction of the imaging lens unit 101 based on focus lens drive information acquired from the camera body 120 for focusing of the camera.

The focus lens unit 104 may include one or more focus lenses. The interchangeable lens 100 is illustrated as a single focus lens for simple drawing in this embodiment but may be a lens (zoom lens) with a variable focal length. In a case where the interchangeable lens 100 is a zoom lens, the lens control unit 111 acquires focal length information from an encoder configured to detect a zoom lens position. In a case where the interchangeable lens 100 has an image stabilizing function, the lens control unit 111 controls a shift lens unit (image stabilizing lens unit) for image stabilization, for example.

The camera body 120 has a function to detect objects in an image and select an object (foremost object) positioned at the front of a moving direction as a main object to be focused. The object is, for example, a human face, a human body, a particular animal such as a dog or a cat, or a vehicle such as an automobile or a motorcycle.

A shutter 121 is used for exposure control. An image sensor 122 is includes a complementary metal oxide film semiconductor (CMOS) sensor or the like and acquires an image. The image sensor 122 transmits an imaging signal to an analog signal processing circuit 123. The analog signal processing circuit 123 performs processing for the imaging signal acquired from the image sensor 122 and then transmits the processed imaging signal as an image to a camera signal processing circuit 124. In this embodiment, the image sensor 122 and the analog signal processing circuit 123 constitute an imaging unit configured to acquire an image.

A camera system control microcomputer (referred to as a camera control unit hereinafter) 131 is a control apparatus configured to control the entire camera. For example, the camera control unit 131 controls driving of an unillustrated shutter drive motor and drives the shutter 121. A memory card 125 is a recording medium configured to record a captured image. A pressed state of a release switch 181 operable by a photographer is transferred to the camera control unit 131, and an image captured in accordance with the pressed state is stored in the memory card 125.

An image display unit 171 includes a display device such as a liquid crystal display (LCD), and displays a scene (view) to be captured by the photographer with the camera and displays a captured image. A touch panel 172 is an operation unit through which the photographer can designate a coordinate on the image display unit 171 with a finger or a touch pen. The touch panel 172 may be integrated with the image display unit 171. For example, the touch panel 172 may be incorporated inside the image display unit 171 without interference with display on the image display unit 171. In this case, an input coordinate on the touch panel 172 is associated with a display coordinate on the image display unit 171. Accordingly, a graphical user interface (GUI) can be configured such that the photographer can directly operate a screen displayed on the image display unit 171. The state of an operation on the touch panel 172 is managed by the camera control unit 131.

The camera body 120 includes a mount contact portion 161, which serves as a communication terminal for performing communication with the interchangeable lens 100, on a mount surface where the interchangeable lens 100 is attached. The interchangeable lens 100 also includes a mount contact portion 114, which serves as a communication terminal for performing communication with the camera body 120, on the mount surface where the camera body 120 is attached.

The lens control unit 111 and the camera control unit 131 control communication to perform serial communication at a predetermined timing through the mount contact portions 114 and 161. By the communication, focus lens drive information, aperture drive information, and the like are transferred from the camera control unit 131 to the lens control unit 111, and optical information such as a focal length is transferred from the lens control unit 111 to the camera control unit 131.

The camera signal processing circuit 124 includes an object detector 141. The object detector 141 detects objects from an image and transmits detection information on the objects (information on the objects) to the camera control unit 131.

The camera control unit 131 includes an object counter (acquiring unit) 150, a time-series correlation processing unit (comparator) 151, an AF target setting unit (selecting unit) 152, a focus detector 153, and a depth-of-field setting unit (setting unit) 154. The object counter 150 counts (acquires) the number of objects included in an image by using the detection information from the object detector 141. The time-series correlation processing unit 151 compares the detection information from the object detector 141 at temporally distinct points (a first timing and a second timing later than the first timing) and determines whether the same target is detected. The AF target setting unit 152 notifies the focus detector 153 of a designated area as an AF target. The AF target setting unit 152 in this embodiment determines (selects), as an AF target, the area of an object (foremost object) positioned at the front of the moving direction among objects included in an image by using the detection information from the object detector 141. The method of determining the foremost object can use, for example, a method using motion vectors or a method based on an algorithm learned by machine learning of the foremost object. The focus detector 153 performs focus detecting processing based on an image signal corresponding to a main object notified by the AF target setting unit 152. The focus detecting processing is executed, for example, by a phase-difference detecting method or a contrast detecting method. In the case of the phase-difference detecting method, the focus detecting processing calculates an image shift amount through correlation calculation of a pair of image signals with a parallax or converts the image shift amount into a defocus amount for calculation. The defocus amount can be further converted into a focus lens drive amount by considering sensitivity of the interchangeable lens 100 in lens drive and the like. The depth-of-field setting unit 154 performs processing of determining (setting) the range of the depth of field based on outputs from the object counter 150, the time-series correlation processing unit 151, and the focus detector 153 and converting the range into an aperture amount.

The camera control unit 131 transmits a focus lens drive amount detected by the focus detector 153 and an aperture amount calculated by the depth-of-field setting unit 154 to the lens control unit 111. The focus lens control unit 113 controls the focus lens unit 104 based on the focus lens drive information received from the camera control unit 131. The aperture control unit 112 controls the aperture stop 103 based on the aperture amount received from the camera control unit 131.

Figure 2:
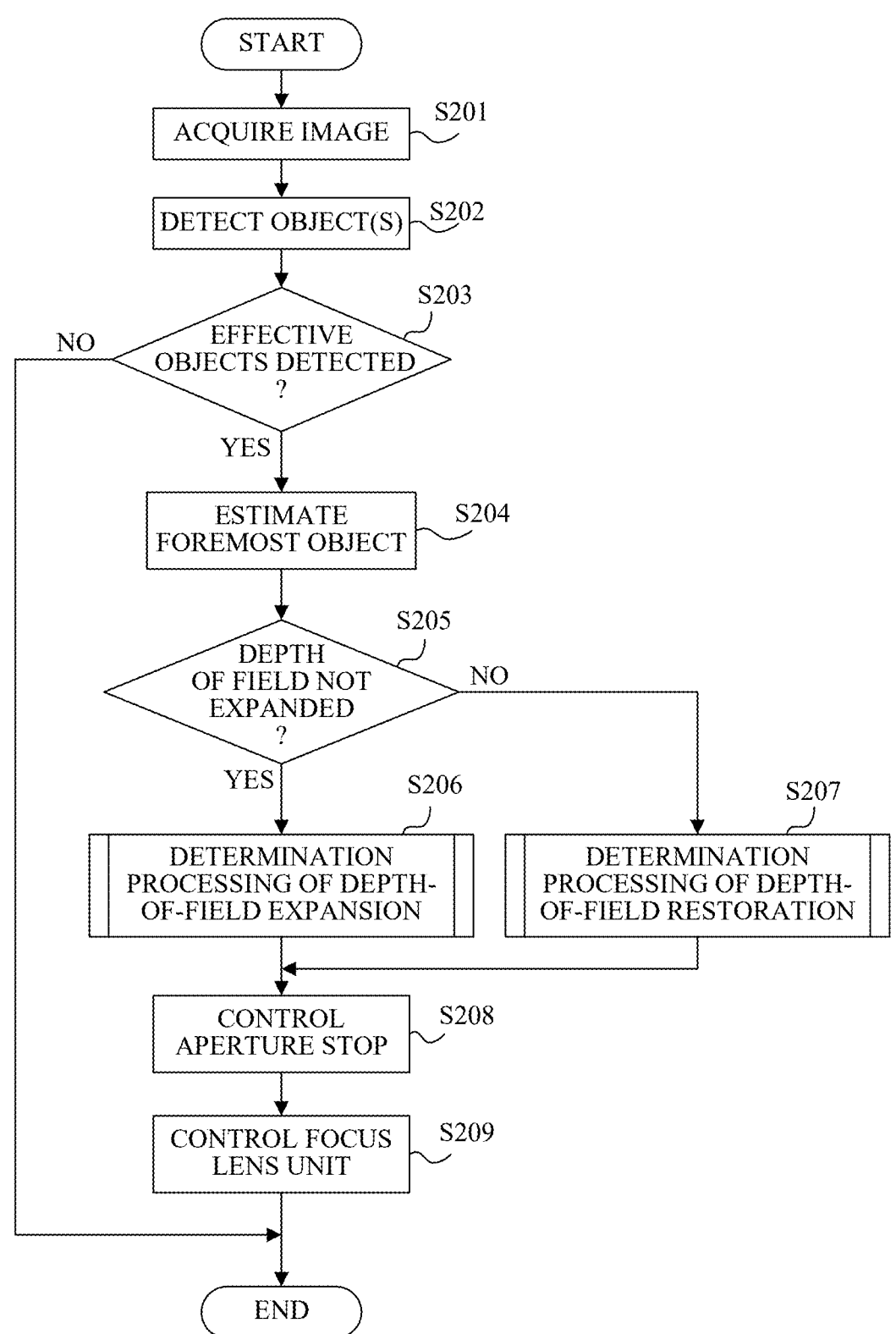
FIG. 2 is a flowchart illustrating an operation from the acquisition of an image to the control of an interchangeable lens.

An operation of the camera according to this embodiment will be described below. The description is first made of an operation by the camera involving acquiring an image, determining a target to be focused on and a depth of field, and controlling the interchangeable lens 100. FIG. 2 is a flowchart illustrating the operation from acquiring of an image to controlling the interchangeable lens 100.

In step S201, the analog signal processing circuit 123 processes an imaging signal acquired the image sensor 122 and sends the imaging signal as an image to the camera signal processing circuit 124.

In step S202, the object detector 141 detects one or more objects from the acquired image. The detection information is sent to the camera control unit 131.

In step S203, the camera control unit 131 determines whether effective objects are detected by the object detector 141 by using the detection information from the object detector 141. The camera control unit 131 performs processing of step S204 in a case where the camera control unit 131 determines that the effective object or objects are detected, or ends this flow otherwise.

In step S204 (selecting step), the AF target setting unit 152 estimates (selects) a foremost object and sets an area of the foremost object as an AF target.

In step S205, the camera control unit 131 determines whether the depth of field is not expanded (the depth of field is set to a first depth of field). The camera control unit 131 performs processing of step S206 in a case where the camera control unit 131 determines that the depth of field is not expanded. On the other hand, the camera control unit 131 performs processing of step S207 in a case where the camera control unit 131 determines that the depth of field is expanded (the depth of field is set to a second depth of field deeper than the first depth of field). In a case where a frame for which the flow in FIG. 2 is executed for the first time, it is determined that the depth of field is not expanded.

In step S206, the camera control unit 131 executes determination processing of depth-of-field expansion. After the processing of this step is executed, an in-focus depth and a depth of field are determined.

In step S207, the camera control unit 131 performs determination processing of depth-of-field restoration. After the processing of this step is executed, an in-focus depth and a depth of field are determined.

In step S208, the aperture control unit 112 controls the aperture stop 103 in accordance with the set depth of field.

In step S209, the focus lens control unit 113 controls the focus lens unit 104 in accordance with the set AF target and the in-focus depth.

Figure 3:
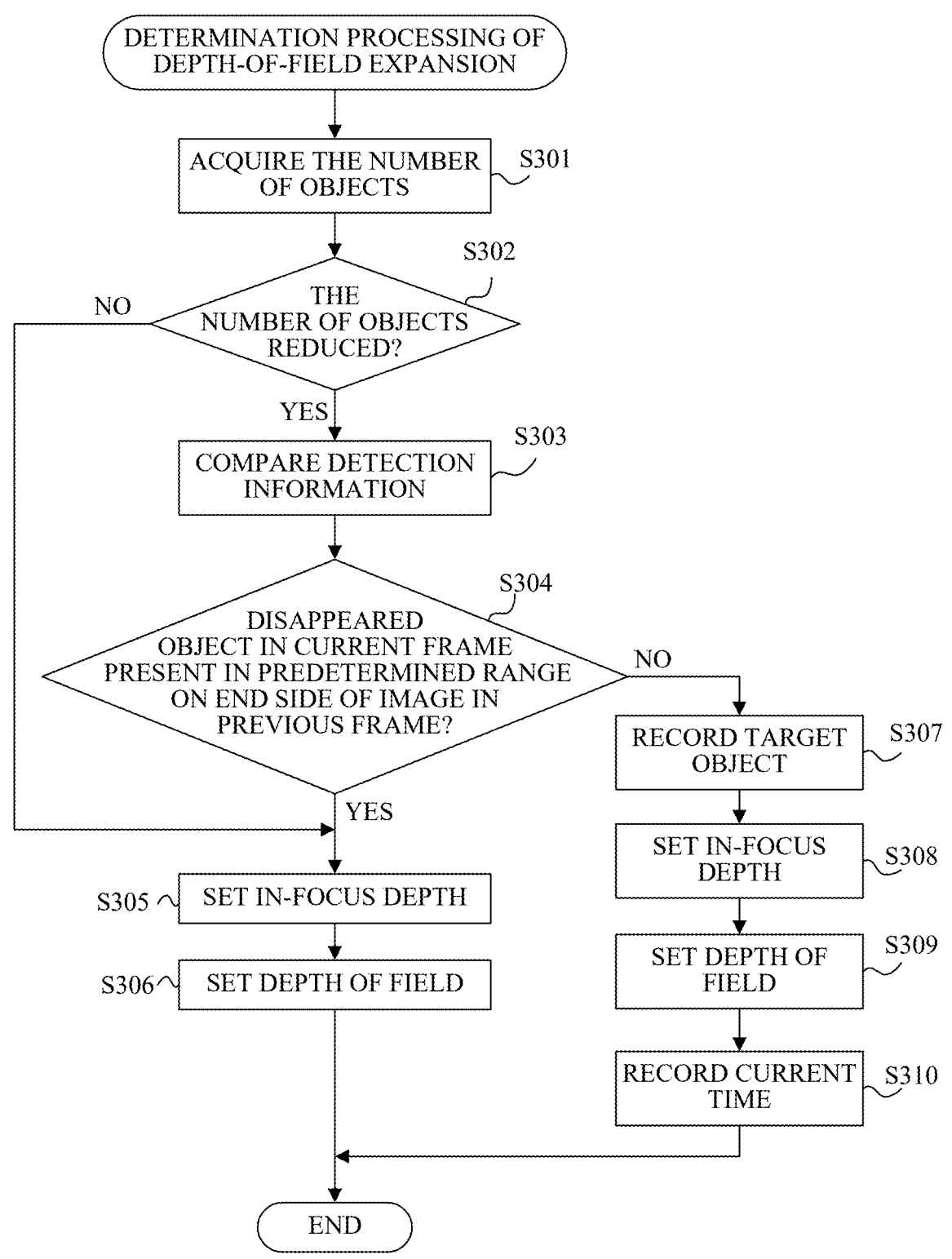
FIG. 3 is a flowchart illustrating determination processing of depth-of-field expansion.

Referring now to FIG. 3, a description will be given of the determination processing of depth-of-field expansion in step S206. The determination processing of depth-of-field expansion is processing of determining whether to expand the depth of field in a case where the depth of field is not expanded and of determining the in-focus depth and the depth of field. FIG. 3 is a flowchart illustrating the determination processing of depth-of-field expansion.

In step S301 (acquiring step), the object counter 150 counts (acquires) the number of objects included in an image.

In step S302, the camera control unit 131 determines whether the number of objects counted in step S301 is smaller than the number of objects in the previous frame. The camera control unit 131 executes processing of step S303 in a case where the camera control unit 131 determines that the number of objects counted in step S301 is smaller than the number of objects in the previous frame, or executes processing of step S305 in a case where the camera control unit 131 determines otherwise. In a case of a frame for which the flow in FIG. 3 is executed for the first time, determination is performed with the number of objects in the previous frame regarded as zero. In this embodiment, whether objects are hidden (superimposed) in the depth direction and invisible is determined by using the number of objects, but this embodiment is not limited. Any other method capable of determining whether objects are hidden in the depth direction may be used.

In step S303, the time-series correlation processing unit 151 compares the detection information from the object detector 141 in the current frame (at the second timing) and the detection information from the object detector 141 in the previous frame (at the first timing).

In step S304, by using a result acquired in step S303, the camera control unit 131 determines whether a disappeared object in the current frame was present (positioned) in a predetermined range (predetermined area) on an end side in an image of the previous frame. In a case where the camera control unit 131 determines that the disappeared object in the current frame was present in a predetermined range on an end side in the image of the previous frame, the camera control unit 131 determines disappearance due to frame-out, and executes processing of step S305. In a case where the camera control unit 131 determines that the disappeared object in the current frame was not present in a predetermined range on an end side in the image of the previous frame, the camera control unit 131 determines disappearance due to shield, and executes processing of step S307.

In step S305, the camera control unit 131 sets the in-focus depth to focus on a depth where the foremost object exists.

In step S306 (setting step), the depth-of-field setting unit 154 sets the depth of field to a depth of field with a normal range (first depth of field).

In step S307, the camera control unit 131 records an object closest to the foremost object in the previous frame among disappeared objects as an object that is a depth-of-field adjustment target (referred to as a target object hereinafter).

In step S308, the camera control unit 131 sets an in-focus depth based on a distance between the camera and the foremost object and a distance between the camera and the target object. The distance is estimated by using a defocus amount of each object obtained from the focus detector 153. The in-focus depth is set to the middle between the foremost object and the target object to minimize an expansion width of the depth of field, prevent an unnecessary area from being in an in-focus state, minimize a lens drive amount, and promote processing completion.

In step S309 (setting step), the depth-of-field setting unit 154 performs a first setting at the in-focus depth set in step S308, which sets a depth of field to a depth of field (second depth of field) with a range that includes both the foremost object and the target object.

In step S310, the camera control unit 131 records the current time, which is measured in the camera. The recorded time is used in the determination processing of depth-of-field restoration.

Figure 4:
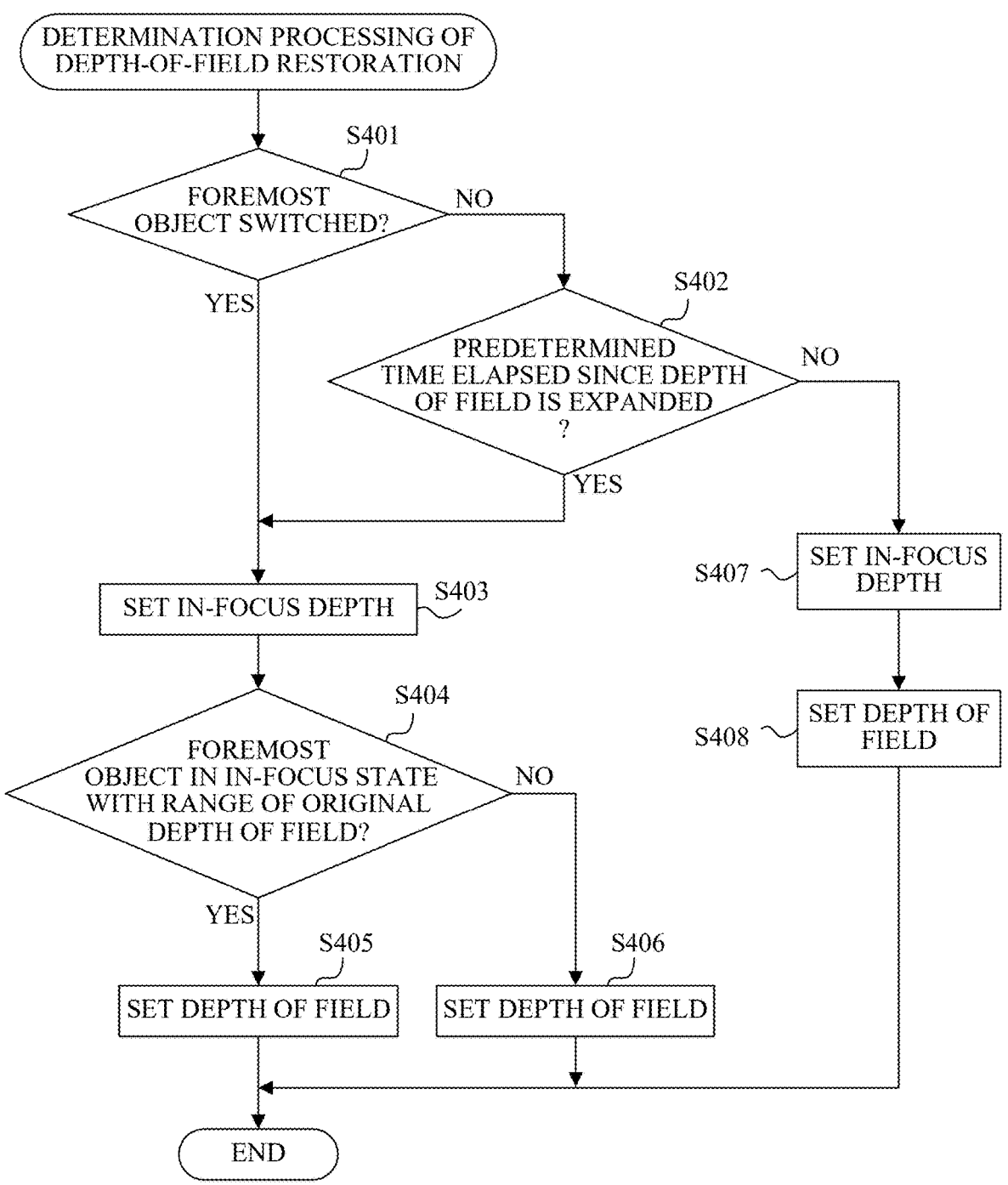
FIG. 4 is a flowchart illustrating determination processing of depth-of-field restoration.

Referring now to FIG. 4, a description will be given of the determination processing of depth-of-field restoration in step S207. The determination processing of depth-of-field restoration is processing of determining whether to restore the original depth of field in a case where the depth of field is expanded and to determine the in-focus depth and the depth of field. FIG. 4 is a flowchart illustrating the determination processing of depth-of-field restoration.

In step S401, the camera control unit 131 determines whether the foremost object estimated in step S204 has been switched from the foremost object in the previous frame. The camera control unit 131 executes processing of step S403 in a case where the camera control unit 131 determines that the foremost object has been switched, or executes processing of step S402 in a case where the camera control unit 131 determines that the foremost object has not been switched.

In step S402, the camera control unit 131 determines whether a predetermined time has elapsed after the depth of field was expanded. The elapsed time is a difference between the time recorded in step S310 and a time at which step S402 is executed. The camera control unit 131 executes processing of step S403 in a case where the camera control unit 131 determines that the predetermined time has elapsed, or executes processing of step S407 in a case where the camera control unit 131 determines that the predetermined time has not elapsed.

In step S403, the camera control unit 131 sets the in-focus depth to focus on a depth where the foremost object exists.

In step S404, the camera control unit 131 determines whether, at the current focus lens position, the foremost object can be in an in-focus state in the original depth-of-field range relative to the in-focus depth set in step S403. The camera control unit 131 executes processing of step S405 in a case where it determines that the foremost object can be in an in-focus state, or executes processing of step S406 in a case where it determines otherwise.

In step S405 (setting step), the depth-of-field setting unit 154 performs a second setting that sets a depth of field to the original depth-of-field (first depth of field) range.

In step S406 (setting step), the depth-of-field setting unit 154 sets a depth of field to an expanded depth-of-field (second depth of field) range. In other words, the expanded depth-of-field range can be maintained.

The processing of step S404 to step S406 is a procedure for maintaining an in-focus state from when the foremost object is switched to when the focus lens unit 104 is driven to reach a position corresponding to the in-focus depth set in step S405.

In step S407, the camera control unit 131 sets an in-focus depth to the middle between the foremost object and the target object.

In step S408 (setting step), the depth-of-field setting unit 154 sets a depth of field to a depth of field (second depth of field) with a range that includes both the foremost object and the target object at the in-focus depth set in step S308.

As described above, the determination processing of depth-of-field restoration regards a decrease in the number of objects as a switching sign of a foremost object, and previously expands a depth of field to create an in-focus state on a new foremost object even just after the foremost object is switched.

Figure 5:
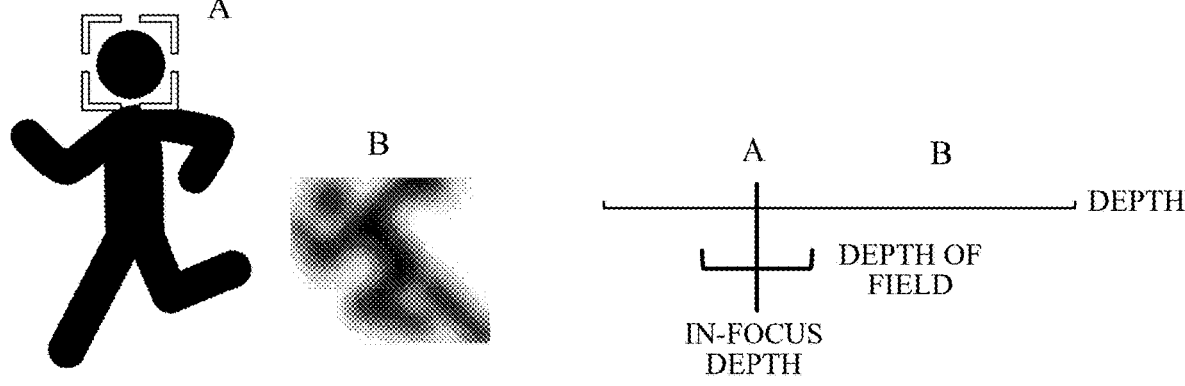
FIG. 5 illustrates a situation before the depth of field is expanded.
Figure 6:
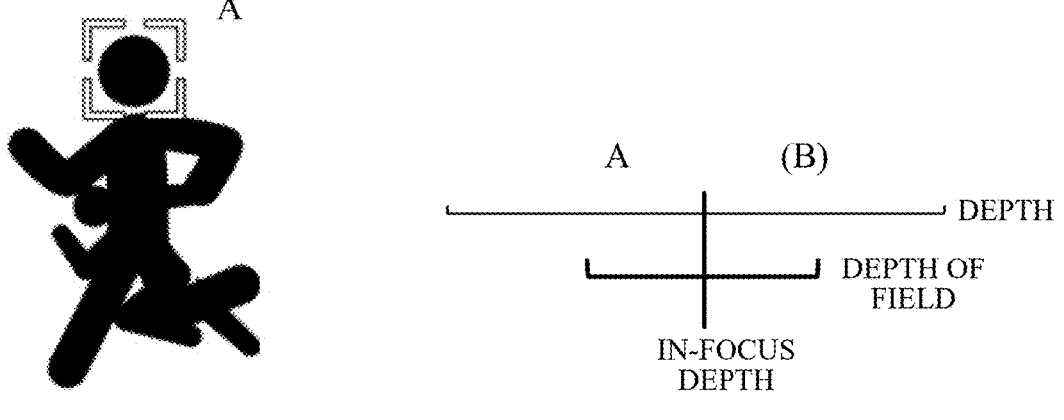
FIG. 6 illustrates a situation after the depth of field is expanded.
Figure 7:
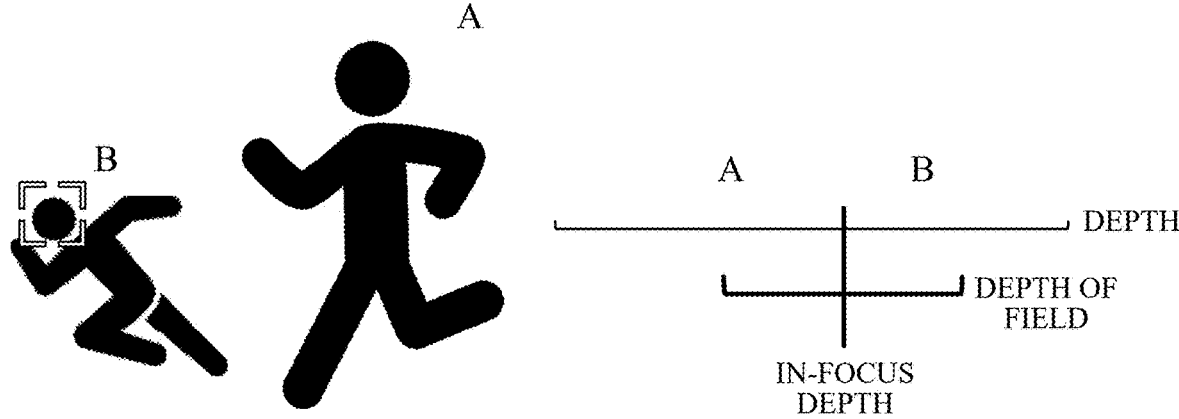
FIG. 7 illustrates a situation right after a foremost object is switched in a state in which the depth of field is expanded.

A description will now be given of settings of a depth of field using a specific example. FIG. 5 illustrates a situation before a depth of field is expanded, in which an object A that is a foremost object and an object B on the rear side of the object A are detected. In FIG. 5, a depth of field is a normal depth of field (first depth of field), which is not expanded and is focused on the object A while the object B is blurred. FIG. 6 illustrates a situation after the number of objects reduces and the depth of field is expanded, which corresponds to a situation in which the object B in the situation of FIG. 5 is shielded by the object A and not detected. In FIG. 6, since the number of objects is reduced, the decrease is regarded as a switching sign of the foremost object and the depth of field is expanded (set to the second depth of field) so that the object B, which has been detected so far, can be included in an in-focus range. In that case, the in-focus depth is positioned at the middle between the objects A and B to minimize the expansion width of the depth of field. FIG. 7 illustrates a situation just after the foremost object is switched while the depth of field is expanded, which corresponds to a situation just after the object B in the situation of FIG. 6 overtakes the object A and becomes a new foremost object. In FIG. 7, since the foremost object has just been switched, driving of the focus lens unit 104 is yet to be completed and the in-focus depth has not been fully adjusted to the position of the object B, but an in-focus state is obtained because the depth of field has previously been expanded.

The configuration according to this embodiment as described above can provide an in-focus state on a new foremost object even just after the foremost object is switched, in a case where a function of switching the AF target to the foremost object is used in imaging sport scenes such as races. Thereby, this configuration can suppress a loss of imaging opportunities and increase suitable imaging opportunities.

This embodiment estimates a disappeared object using detection information correlation between objects in the previous and current frames, but can use another method. For example, a method for tracing a plurality of objects may be used to estimate a disappeared target and its position based on the tracing result.

This embodiment performs processing of restoring a depth of field a predetermined time after the depth of field is expanded and a decrease in the number of objects cannot be regarded as a switching sign of the foremost object. Instead of time elapsing, other information for estimating the non-switching of the foremost object may be used. For example, the number of frames since the depth of field is expanded may be used to estimate that switching of the foremost object does not occur.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

This embodiment can provide a control apparatus capable of suppressing a loss of imaging opportunities.

This application claims priority to Japanese Patent Application No. 2023-209762, which was filed on Dec. 13, 2023, and which is hereby incorporated by reference herein in its entirety.

What is claimed is:

1. A control apparatus comprising:
a memory storing instructions; and
a processor configured to execute the instructions to:
select a main object as a target to be focused on from among objects included in an image,
perform a first setting that sets a first depth of field to a second depth of field deeper than the first depth of field in a case where the objects are superimposed in a depth direction, and
perform a second setting that sets the second depth of field to the first depth of field in a case where the main object is switched after the first setting is performed.

2. The control apparatus according to claim 1, wherein in a case where the number of objects is reduced, the processor is configured not to perform the first setting.

3. The control apparatus according to claim 1, wherein in a case where the number of objects is reduced, the processor is configured to determine a width of the second depth of field in accordance with a distance to a disappeared object.

4. The control apparatus according to claim 2, wherein the processor is configured to:
compare information on the objects acquired from a first image at a first timing and information on the objects acquired from a second image at a second timing later than the first timing, and
determine whether the number of objects is reduced based on determining whether the number of objects at the second timing is smaller than the number of objects at the first timing.

5. The control apparatus according to claim 4, wherein the processor is configured not to perform the first setting in a case where an object not detected from the second image exists in a predetermined area on an end side in the first image.

6. The control apparatus according to claim 3, wherein the processor is configured to:
compare information on the objects acquired from a first image at a first timing and information on the objects acquired from a second image at a second timing later than the first timing, and
determine whether the number of objects is reduced based on determining whether the number of objects at the second timing is smaller than the number of objects at the first timing.

7. The control apparatus according to claim 6, wherein the disappeared object is an object not detected from the second image.

8. The control apparatus according to claim 1, wherein in a case where the number of the objects reduces, the processor is configured to set an in-focus depth and performs the first setting in accordance with the in-focus depth.

9. The control apparatus according to claim 1, wherein the processor is configured to perform the second setting a predetermined time after the first setting is performed.

10. The control apparatus according to claim 1, wherein the processor is configured to perform the second setting in a case where the main object is switched after the first setting is performed and the main object switched is in focus at the first depth of field.

11. The control apparatus according to claim 1, wherein the processor is configured to select a foremost object in a moving direction as the main object.

12. An image pickup apparatus comprising:
the control apparatus according to claim 1; and
an imaging unit configured to acquire an image.

13. A control method comprising the steps of:
selecting a main object as a target to be focused on from among objects included in an image;
performing a first setting that sets a first depth of field to a second depth of field deeper than the first depth of field in a case where the objects are superimposed in a depth direction; and
performing a second setting that sets the second depth of field to the first depth of field in a case where the main object is switched after the first setting is performed.

14. A non-transitory computer-readable storage medium storing a program that causes a computer to execute the control method according to claim 13.

* * * * *